United States Patent
Oowaki

(10) Patent No.: US 10,174,757 B2
(45) Date of Patent: Jan. 8, 2019

(54) OIL PUMP HAVING EXTENSION PORTIONS THAT REDUCE THE EFFECT OF #THE COLLAPSE OF BUBBLES IN THE OIL

(71) Applicant: JTEKT CORPORATION, Osaki-shi (JP)

(72) Inventor: Masaaki Oowaki, Tokai (JP)

(73) Assignee: JTEKT CORPORATION, Osaka-shi (JP)

( * ) Notice: Subject to any disclaimer, the term of this patent is extended or adjusted under 35 U.S.C. 154(b) by 52 days.

(21) Appl. No.: 15/416,383

(22) Filed: Jan. 26, 2017

(65) Prior Publication Data

US 2017/0227003 A1    Aug. 10, 2017

(30) Foreign Application Priority Data

Feb. 4, 2016    (JP) .................. 2016-019730

(51) Int. Cl.
| | |
|---|---|
| F03C 4/00 | (2006.01) |
| F04C 18/00 | (2006.01) |
| F04C 2/00 | (2006.01) |
| F04C 2/10 | (2006.01) |
| F01M 1/02 | (2006.01) |
| F04C 15/06 | (2006.01) |

(52) U.S. Cl.
CPC ............ *F04C 2/10* (2013.01); *F01M 1/02* (2013.01); *F04C 15/06* (2013.01); *F04C 2210/206* (2013.01); *F04C 2240/20* (2013.01); *F04C 2240/30* (2013.01)

(58) Field of Classification Search
CPC ...... F04C 2/10; F04C 15/06; F04C 2210/206; F04C 2240/20; F04C 2240/30; F01M 1/02

USPC ............ 418/166, 171, 180, 189–190, 75, 78
See application file for complete search history.

(56) References Cited

U.S. PATENT DOCUMENTS

| | | | |
|---|---|---|---|
| 2002/0054822 A1* | 5/2002 | Watanabe | F04C 2/102 418/171 |
| 2005/0019196 A1 | 1/2005 | Enzaka et al. | |
| 2006/0140809 A1* | 6/2006 | Enzaka | F04C 2/102 418/171 |
| 2006/0216187 A1 | 9/2006 | Enzaka et al. | |

FOREIGN PATENT DOCUMENTS

| | | |
|---|---|---|
| JP | 2005-42689 | 2/2005 |
| JP | 2006-266161 | 10/2006 |

* cited by examiner

*Primary Examiner* — Theresa Trieu
(74) *Attorney, Agent, or Firm* — Oblon, McClelland, Maier & Neustadt, L.L.P.

(57) ABSTRACT

In an oil pump, an inner rotor and an outer rotor rotate to discharge the oil through a discharge port. The discharge port has an outer extension portion located on a radially inner side with respect to a root circle of the outer rotor and on a radially outer side of a tip circle of the outer rotor and an inner extension portion located on the radially inner side with respect to the tip circle of the outer rotor and on the radially outer side with respect to a root circle of the inner rotor. An inter-tooth chamber facing a partitioning portion that partitions the suction port from the discharge port comes into communication with the outer extension portion and the inner extension portion. Then, a tip seal portion defining the inter-tooth chamber intersects an outer edge of an opening of the discharge port.

2 Claims, 5 Drawing Sheets

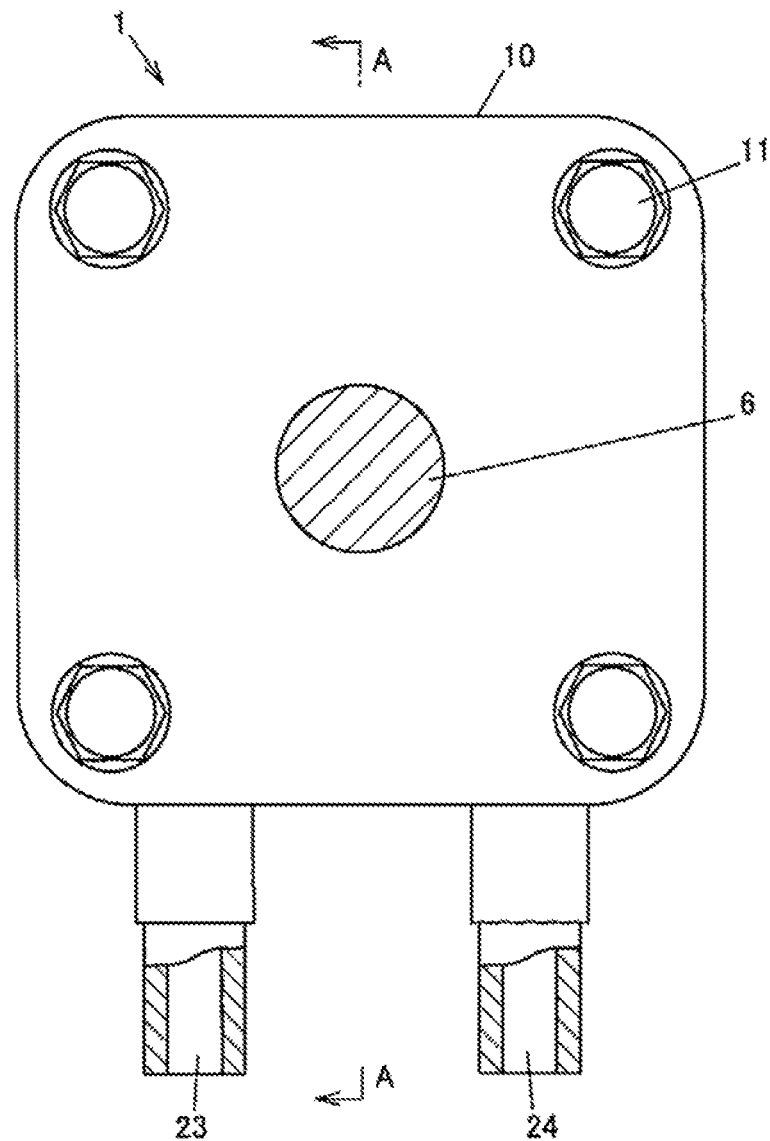

OIL PUMP HAVING EXTENSION PORTIONS THAT REDUCE THE EFFECT OF #THE COLLAPSE OF BUBBLES IN THE OIL

INCORPORATION BY REFERENCE

The disclosure of Japanese Patent Application No. 2016-019730 filed on Feb. 4, 2016 including the specification, drawings and abstract, is incorporated herein by reference in its entirety.

BACKGROUND OF THE INVENTION

1. Field of the Invention

The invention relates to an oil pump in which an inner rotor and an outer rotor having a trochoid tooth profile rotate to allow oil sucked into a pump chamber to be discharged out of the pump chamber through a discharge port.

2. Description of the Related Art

An oil pump in which an inner rotor and an outer rotor having a trochoid tooth profile rotate to allow oil sucked into a pump chamber through a suction port to be discharged out of the pump chamber through a discharge port has been used for hydraulic equipment and the like. In such an oil pump, when the discharge port is brought into communication with one of the inter-tooth chambers formed between tooth profile portions of the inner rotor and tooth profile portions of the outer rotor, the oil at the discharge port may flow into the inter-tooth chamber as a jet due to a difference in pressure between the inter-tooth chamber and the discharge port. This phenomenon is significant when the inter-tooth chamber comes into communication with the discharge port while the pressure in the inter-tooth chamber is not high enough due to many bubbles mixed in the oil. When the oil at the discharge port flows into the inter-tooth chamber as a jet, the bubbles mixed in the oil in the inter-tooth chamber may instantaneously collapse, leading to noise or erosion. Thus, oil pumps have been proposed which include a configuration reducing an increase in pressure when the inter-tooth chamber comes into communication with the discharge port to inhibit possible noise or erosion (see, for example, Japanese Patent Application Publication Nos. 2005-42689 (JP 2005-42689 A) and 2006-266161 (JP 2006-266161 A).

In the oil pump described in JP 2005-42689 A, a shallow groove is formed in a pump housing provided with a pump chamber (rotor chamber) that is in communication with the suction port and the discharge port such that the shallow groove is positioned on a trajectory circumference of a bottom land portion of the outer rotor. When the volume of the inter-tooth chamber decreases from the maximum value, the inter-tooth chamber comes into communication with the discharge port via the shallow groove.

In the oil pump described in JP 2006-266161 A, a shallow groove that is in communication with the discharge port is formed on a radially inner side with respect to the trajectory circle of the bottom land portion of the inner rotor. The shallow groove is in communication with the inter-tooth chamber via a side clearance between a side surface of the inner rotor and a housing.

When the oil pump is used, for example, to lubricate and operate a transmission in an automobile and oil is sucked from an oil pan in a transmission case, the sucked oil may contain a large number of bubbles because the oil is stirred as a result of the rotation of gears or the like. The oil pumps described in JP 2005-42689 A and JP 2006-266161 A may allow inhibition of the adverse effect (noise or erosion) of collapsing bubbles resulting from, for example, cavitation but may fail to produce a sufficient inhibition effect when the sucked oil contains a large number of bubbles. That is, the oil at the discharge port may flow into the inter-tooth chamber as a jet causing rapid elevation of the pressure in the inter-tooth chamber, resulting in noise or erosion.

SUMMARY OF THE INVENTION

An object of the invention is to provide an oil pump that is more effective for inhibiting the adverse effect of instantaneous collapse of bubbles resulting from a rapid increase in the pressure of oil in an inter-tooth chamber between an inner rotor and an outer rotor.

An oil pump in an aspect of the invention includes a pump housing provided with a pump chamber that communicates with a suction port and a discharge port, an inner rotor having a plurality of tooth profile portions on an outer periphery of the inner rotor, and an outer rotor having more tooth profile portions on an inner periphery of the outer rotor than the inner rotor and forming a plurality of inter-tooth chambers between the outer rotor and the inner rotor. The inner rotor and the outer rotor rotate eccentrically in a predetermined rotating direction in the pump housing while meshing with each other to allow oil to be sucked into the pump chamber through the suction port and to allow oil to be discharged out of the pump chamber through the discharge port. The inter-tooth chambers are separated from one another by proximate portions, in each of which the tooth profile portion of the inner rotor lies close to the tooth profile portion of the outer rotor. The pump chamber is formed as a recess that is recessed in a direction of a rotation axis of the inner rotor and the outer rotor, the suction port and the discharge port have openings in a bottom surface of the pump chamber, and a partitioning portion is provided on the bottom surface to partition the suction port from the discharge port. At a backward end of the discharge port in the rotating direction, an outer extension portion is provided which extends backward in the rotating direction on a radially inner side with respect to a root circle of the outer rotor and on a radially outer side with respect to a tip circle of the outer rotor, and an inner extension portion is also provided which extends backward in the rotating direction on the radially inner side with respect to the tip circle of the outer rotor and on the radially outer side with respect to a root circle of the inner rotor. When the inner rotor and the outer rotor rotate in the rotating direction, the inter-tooth chamber facing the partitioning portion comes into communication with the outer extension portion and the inner extension portion, and the proximate portion that separates the inter-tooth chamber from other inter-tooth chambers located forward in the rotating direction intersects an outer edge of the opening of the discharge port.

The invention allows provision of an oil pump that is more effective for inhibiting the adverse effect of instantaneous collapse of bubbles resulting from a rapid increase in the pressure of oil in the inter-tooth chamber between the inner rotor and the outer rotor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1A is a front view of an oil pump according to an embodiment of the invention;

DETAILED DESCRIPTION OF EMBODIMENTS

Figure 1B:
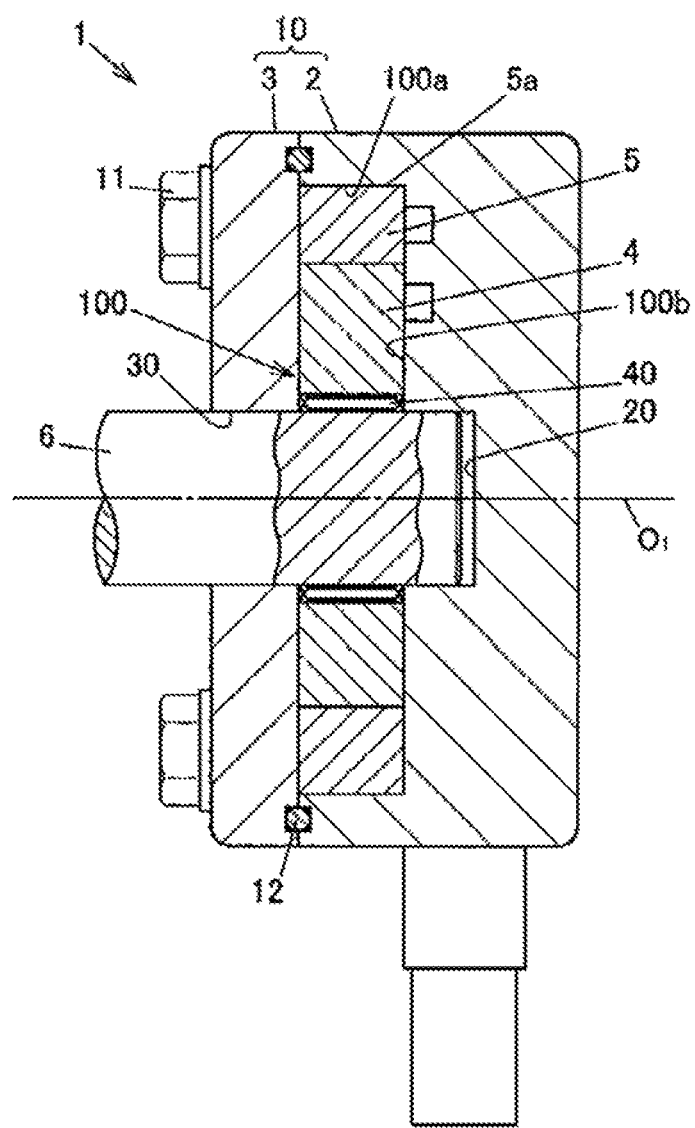
FIG. 1B is a sectional view of the oil pump taken along line A-A in FIG. 1A.
Figure 2:
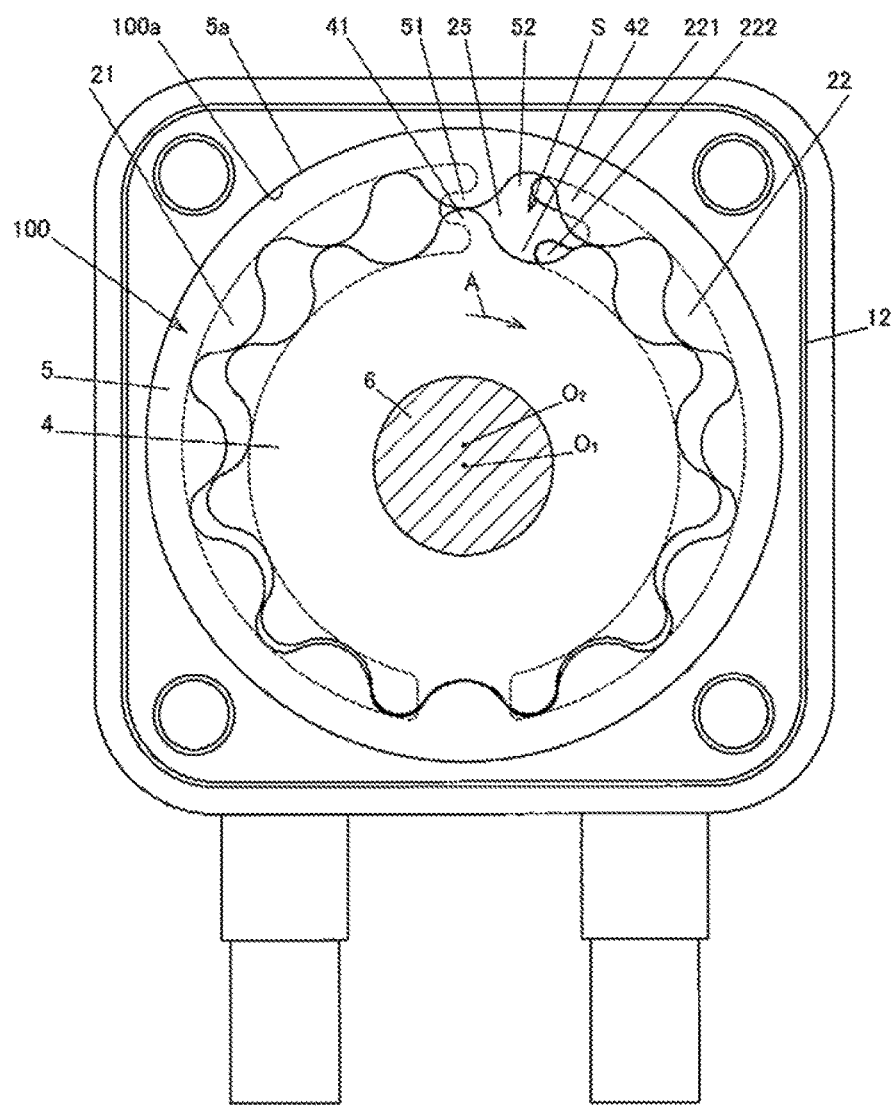
FIG. 2 is a diagram depicting an internal structure of the oil pump.

An embodiment of the invention will be described with reference to FIGS. 1 to 4. FIGS. 1A and 1B depict an oil pump according to an embodiment of the invention. FIG. 1A is a front view, and FIG. 1B is a sectional view taken along line A-A in FIG. 1A. FIG. 2 is a diagram depicting an internal structure of the oil pump. An oil pump 1 is used, for example, to lubricate and operate components of a transmission in an automobile. The oil pump 1 sucks oil from an oil pan in a transmission case and discharges the oil.

The oil pump 1 is a torochoidal inscribed gear pump and has a pump housing 10 including a main body portion 2 and a cover portion 3, an inner rotor 4 and an outer rotor 5 housed in a pump chamber 100 in the pump housing 10 and having a torochoid tooth profile, and a shaft 6 that applies a turning force to the inner rotor 4. FIG. 2 depicts the oil pump 1 with the cover portion 3 removed therefrom as viewed in an axial direction.

In the main body portion 2 of the pump housing 10, the pump chamber 100 is formed as a recess that is recessed in the direction of a rotation axis $O_1$ of the inner rotor 4 and the outer rotor 5 with respect to a surface of the main body portion 2 that mates with the cover portion 3. The main body portion 2 and the cover portion 3 are clamped to each other with a plurality of (four) bolts, and a seal member 12 that is an elastic body such as rubber inhibits leakage of oil through a clearance between the main body portion 2 and the cover portion 3.

The inner rotor 4 is coupled to the shaft 6 at a spline fitting portion 40 so as to be inhibited from rotating relative to the shaft 6. The inner rotor 4 is rotated around the rotation axis $O_1$ by a turning force received through the shaft 6. The shaft 6, for example, receives a driving force from a driving source such as an engine in an automobile through a driving force transmission mechanism that is a chain, a sprocket, or a gear mechanism, to rotate the inner rotor 4 in a predetermined rotating direction (the direction of arrow A depicted in FIG. 2). The shaft 6 penetrates a through-hole 30 formed in the cover portion 3 and has a tip portion housed in a hole portion 20 formed in the main body portion 2 of the pump housing 10.

The inner rotor 4 has a plurality of tooth profile portions 41 located on an outer periphery of the inner rotor 4 and protruding outward. Recessed portions 42 are each formed between the two tooth profile portions 41 adjacent to each other in a circumferential direction. In the present embodiment, the inner rotor 4 has 11 tooth profile portions 41.

The outer rotor 5 is shaped like a ring having an outer peripheral surface 5a that slides on an inner peripheral surface 100a of the pump chamber 100. The outer rotor 5 has a plurality of tooth profile portions 51 located on an inner periphery of the outer rotor 5 and protruding inward. Recessed portions 52 are each formed between the two tooth profile portions 51 adjacent to each other in the circumferential direction. In the present embodiment, the outer rotor 5 has 12 tooth profile portions 51. That is, the number of the tooth profile portions 51 of the outer rotor 5 is larger than the number of the tooth profile portions 41 of the inner rotor 4 by one. The outer rotor 5 meshes with the inner rotor 4 arranged inside the outer rotor 5 to receive the turning force of the inner rotor 4 to rotate in the pump chamber 100 around a rotation axis $O_2$ that is eccentric with respect to the rotation axis $O_1$. The rotation axis $O_2$ coincides with a center axis of the pump chamber 100.

A plurality of inter-tooth chambers S is formed between the outer rotor and the inner rotor 4. The outer rotor 5 rotates in the same direction in which the inner rotor 4 rotates, at a speed that corresponds to a difference in the number of teeth and that is lower than the speed at which the inner rotor 4 rotates. The inter-tooth chambers S are each formed by communication between a corresponding recessed portion 42 of the inner rotor 4 and a corresponding recessed portion 52 of the outer rotor 5. The volume of each of the inter-tooth chambers S is small in an area in which the corresponding tooth profile portion 41 of the inner rotor 4 deeply meshes with the corresponding tooth profile portion 51 of the outer rotor 5, and gradually increases with decreasing depth of meshing between the tooth profile portions 41, 51. The inter-tooth chambers S are separated from one another by proximate portions in each of which the tooth profile portion 41 of the inner rotor 4 lies close to the tooth profile portion 51 of the outer rotor 5. The proximate portions are located near bottom portions of the recessed portions 42, 52 when the tooth profile portions 41, 51 deeply mesh with each other, and are located at tooth tip portions of the tooth profile portions 41, 51 when the tooth profile portions 41, 51 shallowly mesh with each other. The proximate portions between the tooth profile portions 41, 51 are hereinafter sometimes referred to as tip seal portions.

A suction port 21 and a discharge port 22 are formed in the main body portion 2 of the pump housing 10. The pump chamber 100 is in communication with the suction port 21 and the discharge port 22. The suction port 21 and the discharge port 22 have openings in a bottom surface 100b of the pump chamber 100. In FIG. 2, outer edges of the openings of the suction port 21 and the discharge port 22 in the bottom surface 100b of the pump chamber 100 are depicted by dashed lines. The suction port 21 is in communication with an inlet passage 23 formed in the main body portion 2. The discharge port 22 is in communication with an outlet passage 24 formed in the main body portion 2.

The suction port 21 communicates with each of the inter-tooth chambers S in an area where the volume of the inter-tooth chamber S gradually increases. The discharge port 22 communicates with each of the inter-tooth chambers S in an area where the volume of the inter-tooth chamber S gradually decreases. The inner rotor 4 and the outer rotor 5 rotate eccentrically in a predetermined rotating direction in the pump housing 10 while meshing with each other to allow the oil to be sucked into the pump chamber 100 through the suction port 21 and to allow the oil to be discharged out of the pump chamber 100 through the discharge port 22.

A partitioning portion 25 that partitions the suction port 21 from the discharge port 22 is provided on the bottom surface 100b of the pump chamber 100 between an end edge of the suction port 21 (a forward end in the rotating direction of the inner rotor 4 and the outer rotor 5) and a start edge of the discharge port 22 (a backward end in the rotating direction of the inner rotor 4 and the outer rotor 5).

Figure 3A:
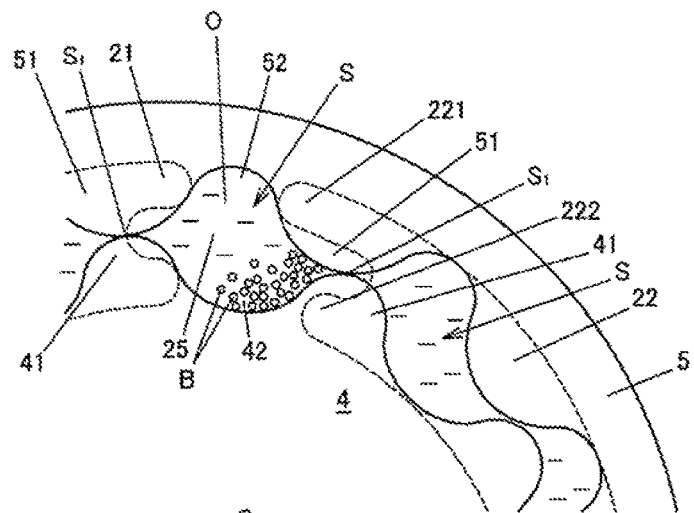
FIG. 3A is a diagram depicting a periphery of a start edge of a discharge port and illustrating an operation during rotation of an inner rotor and an outer rotor.
Figure 3B:
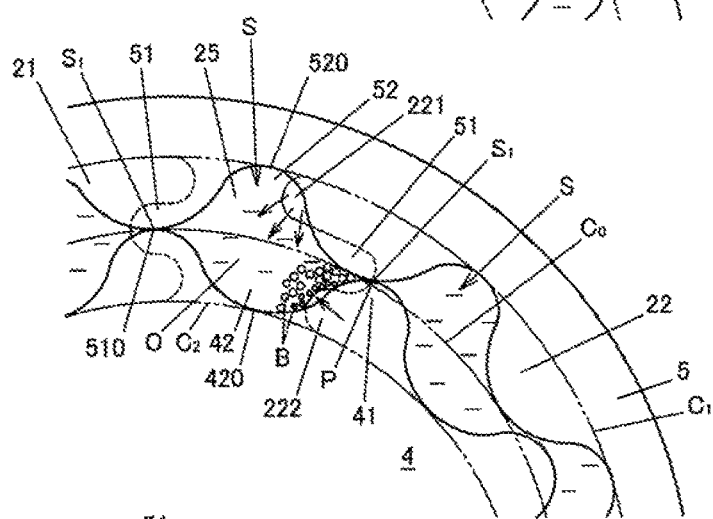
FIG. 3B is a diagram depicting the periphery of the start edge of the discharge port and illustrating an operation during rotation of the inner rotor and the outer rotor.
Figure 3C:
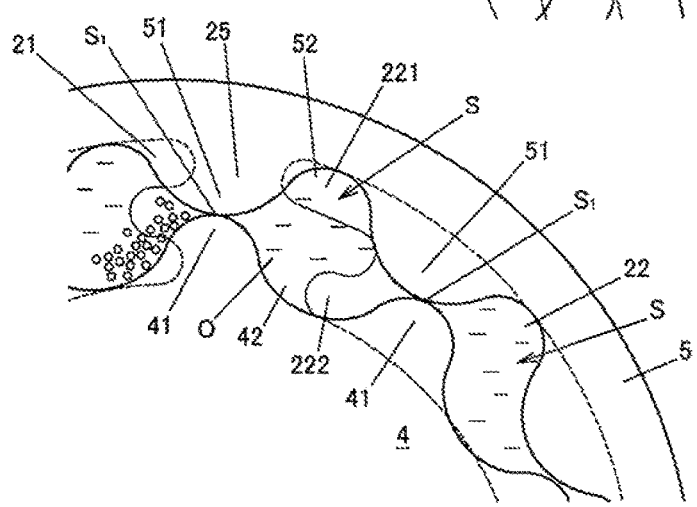
FIG. 3C is a diagram depicting the periphery of the start edge of the discharge port and illustrating an operation during rotation of the inner rotor and the outer rotor.
Figure 4:
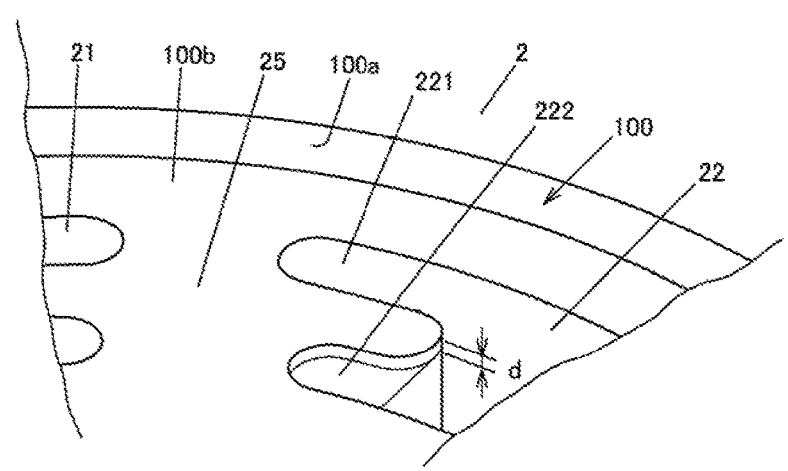
FIG. 4 is a perspective view depicting the start edge of the discharge port.

FIGS. 3A to 3C are diagrams depicting a periphery of the start edge of the discharge port 22 and illustrating operations during rotation of the inner rotor 4 and the outer rotor 5. FIG. 4 is a perspective view depicting the start edge of the discharge port 22.

As depicted in FIG. 3A, oil O in the inter-tooth chamber S positioned at the partitioning portion 25 contains a large number of bubbles B. The bubbles B include bubbles fed from the exterior of the oil pump 1 via the inlet passage 23 and the suction port 21 and bubbles resulting from cavitation of the oil O. A countless number of fine bubbles B are present in the oil O. However, in FIGS. 3A, 3B, and 3C, the bubbles are illustrated larger than in reality for clarification of description.

Inside each of the inter-tooth chambers S, the oil O is subjected to a centrifugal force resulting from rotation of the inner rotor 4 and the outer rotor 5. Thus, the recessed portions 52 of the outer rotor 5 are filled with the oil O, and the bubbles B are eccentrically present in a forward side of each of the recessed portions 42 of the inner rotor 4 in the rotating direction. When the bubbles B are instantaneously collapsed by a rapid increase in pressure, heavy noise is generated and erosion occurs which will damage the inner rotor 4, the outer rotor 5, or the pump housing 10, which may fail to deliver intended performance thereof. Thus, in the oil pump 1 according to the present embodiment, an outer extension portion 221 and an inner extension portion 222 are provided at the start edge of the discharge port 22 as a configuration that allows the bubbles B to gradually disappear.

In FIG. 3B, an intersection position is denoted by P where the outer edge of the opening of the discharge port 22 is intersected by the proximate portion (tip seal portion $S_1$) in which a tip surface of the tooth profile portion 41 of the inner rotor 4 lies close to a tip surface of the tooth profile portion 51 of the outer rotor 5 as viewed in the axial direction parallel to the rotation axes $O_1$, $O_2$. In FIG. 3B, a tip circle $C_0$ of the outer rotor 5 is denoted by a long dashed short dashed line. Moreover, in FIG. 3B, a root circle $C_1$ of the outer rotor 5 and a root circle $C_2$ of the inner rotor 4 are depicted by long dashed double-short dashed lines. The tip circle $C_0$ of the outer rotor 5 corresponds to a moving trajectory of a tooth tip portion 510 that is a tip portion of each tooth profile portion 51. The root circle $C_1$ of the outer rotor 5 corresponds to a moving trajectory of a bottom land portion 520 that is the deepest portion of each recessed portion 52 during rotation of the outer rotor 5. The root circle $C_2$ of the inner rotor 4 corresponds to a moving trajectory of a bottom land portion 420 that is the deepest portion of each recessed portion 42 during rotation of the inner rotor 4.

The outer extension portion 221 extends on a radially inner side with respect to the root circle $C_1$ of the outer rotor 5 and on a radially outer side with respect to the tip circle $C_0$ of the outer rotor 5 and backward of the intersection position P in the rotating direction of the inner rotor 4 and the outer rotor 5. The inner extension portion 222 extends on the radially inner side with respect to the tip circle $C_0$ of the outer rotor 5 and on the radially outer side with respect to the root circle $C_2$ of the inner rotor 4 and backward of the intersection position P in the rotating direction of the inner rotor 4 and the outer rotor 5.

When the inner rotor 4 and the outer rotor 5 rotate, the inter-tooth chamber S facing the partitioning portion 25 comes into communication with the outer extension portion 221 and the inner extension portion 222, and then, the tip seal portion $S_1$ that separates the inter-tooth chamber S from the other inter-tooth chambers S located forward in the rotating direction of the inner rotor 4 and the outer rotor 5 intersects the outer edge of the opening of the discharge port 22. More specifically, in the present embodiment, when the inner rotor 4 and the outer rotor 5 rotate, the inter-tooth chamber S facing the partitioning portion 25 comes into communication with the outer extension portion 221 and then with the inner extension portion 222, and subsequently, the tip seal portion $S_1$ intersects the outer edge of the discharge port 22. The phrase "facing the partitioning portion" as used herein refers to a state where at least a part of the inter-tooth chamber S overlaps the partitioning portion 25 when the inner rotor 4 and the outer rotor 5 in the pump chamber 100 are viewed in a direction perpendicular to the bottom surface 100b.

As depicted in FIG. 4, in the present embodiment, the inner extension portion 222 is formed of a shallow groove that is shallower than the outer extension portion 221 in the direction of the rotation axis of the inner rotor 4 and the outer rotor 5. The inner extension portion 222 is shallower than the outer extension portion 221 in the direction perpendicular to the bottom surface 100b of the pump chamber 100 (axial direction). A depth d of the inner extension portion 222 is, for example, 1 to 2 mm. Consequently, the oil O flowing into the inter-tooth chamber S through the inner extension portion 222 has a lower flow rate than the oil O flowing into the inter-tooth chamber S through the outer extension portion 221.

As depicted in FIG. 3A, when the inter-tooth chamber S is entirely located between the end edge of the suction port 21 and the start edge of the discharge port 22, the oil O in the inter-tooth chamber S has a lower oil pressure than the oil at the discharge port 22. Thus, when the inter-tooth chamber S comes into communication with the outer extension portion 221 as a result of the rotation of the inner rotor 4 and the outer rotor 5, the oil O flows into the inter-tooth chamber S through the outer extension portion 221 as depicted by an arrow in FIG. 3B. Consequently, the pressure in the inter-tooth chamber S is elevated to reduce the bubbles B in size, and some of the bubbles B disappear (collapse). The oil O having flowed into the inter-tooth chamber S through the outer extension portion 221 allows the bubbles B to be collected on a forward side of the corresponding recessed portion 42 of the inner rotor 4 in the rotating direction.

Then, the inter-tooth chamber S comes into communication with the inner extension portion 222 as a result of rotation of the inner rotor 4 and the outer rotor 5, and the oil O flows into the inter-tooth chamber S through the inner extension portion 222. At this time, an area with which the inner extension portion 222 first comes into communication is the forward side of the recessed portion 42 of the inner rotor 4 in the rotating direction. Consequently, the bubbles B collected on the forward side of the recessed portion 42 of the inner rotor 4 in the rotating direction are further reduced in size or eliminated as a result of an increase in pressure. When the intersection position P is passed by one of the paired tip seal portions $S_1$ defining the inter-tooth chamber S, that is, the tip seal portion $S_1$ located forward in the rotating direction, more oil O flows into the inter-tooth chamber S to make the remaining bubbles B mostly disappear.

Subsequently, the volume of the inter-tooth chamber S gradually decreases in conjunction with the rotation of the inner rotor 4 and the outer rotor 5, allowing the oil O in the inter-tooth chamber S to be discharged into the discharge port 22.

The above-described embodiment produces effects described below.

(1) After the inter-tooth chamber S comes into communication with the outer extension portion 221 and the inner extension portion 222 and the pressure in the inter-tooth chamber S is elevated by the oil O flowing into the inter-tooth chamber S through the outer extension portion 221 and the inner extension portion 222, the tip seal portion S, between the inner rotor 4 and the outer rotor 5 intersects the outer edge of the discharge port 22. Consequently, the pressure in the inter-tooth chamber S increases slowly to enable suppression of the adverse effect (noise, erosion, vibration, or the like) of instantaneous collapse of the bubbles B resulting from a rapid increase in the pressure of the oil O within the inter-tooth chamber S. More specifically, the pressure in the inter-tooth chamber S increases slowly in three stages including a stage where the inter-tooth chamber S comes into communication with the outer extension portion 221, a stage where the inter-tooth chamber S comes into communication with the inner extension portion 222, and a stage where the tip seal portion S, intersects the outer edge of the discharge port 22 to bring the inter-tooth chamber S into communication with the discharge port 22 between the outer extension portion 221 and the inner extension portion 222. Thus, the adverse effect (noise, erosion, vibration, or the like) of instantaneous collapse of the bubbles B can be suppressed.

(2) In the present embodiment, the inter-tooth chamber S comes into communication with the outer extension portion 221 before the inter-tooth chamber S comes into communication with the inner extension portion 222. Thus, the communication between the inter-tooth chamber S and the inner extension portion 222 allows efficient elimination of the bubbles B collected on the forward side of the corresponding recessed portion 42 of the inner rotor 4 in the rotating direction as a result of the communication between the inter-tooth chamber S and the outer extension portion 221. Consequently, the adverse effect of instantaneous collapse of the bubbles B can be more reliably suppressed.

(3) The inner extension portion 222 is formed of the shallow groove that is shallower than the outer extension portion 221 in the direction of the rotation axis of the inner rotor 4 and the outer rotor 5. This reduces momentum of the oil O flowing into the inter-tooth chamber S through the inner extension portion 222. Consequently, rapid collapse of the bubbles B can be suppressed when the inter-tooth chamber S comes into communication with the inner extension portion 222.

What is claimed is:

1. An oil pump comprising:
a pump housing provided with a pump chamber that communicates with a suction port and a discharge port;
an inner rotor having a plurality of tooth profile portions on an outer periphery of the inner rotor; and
an outer rotor having more tooth profile portions on an inner periphery of the outer rotor than the inner rotor and forming a plurality of inter-tooth chambers between the outer rotor and the inner rotor,
wherein the inner rotor and the outer rotor rotate eccentrically in a predetermined rotating direction in the pump housing while meshing with each other to allow oil to be sucked into the pump chamber through the suction port and to allow the oil to be discharged out of the pump chamber through the discharge port,
wherein the inter-tooth chambers are separated from one another by proximate portions, in each of which the tooth profile portion of the inner rotor lies close to the tooth profile portion of the outer rotor,
wherein the pump chamber is formed as a recess that is recessed in a direction of a rotation axis of the inner rotor and the outer rotor, the suction port and the discharge port have openings in a bottom surface of the pump chamber, and a partitioning portion is provided on the bottom surface to partition the suction port from the discharge port,
wherein at a backward end of the discharge port in the rotating direction, an outer extension portion is provided which extends backward in the rotating direction on a radially inner side with respect to a root circle of the outer rotor and on a radially outer side with respect to a tip circle of the outer rotor, and an inner extension portion is also provided which extends backward in the rotating direction on the radially inner side with respect to the tip circle of the outer rotor and on the radially outer side with respect to a root circle of the inner rotor,
wherein when the inner rotor and the outer rotor rotate in the rotating direction, the proximate portion that separates the inter-tooth chamber from other inter-tooth chambers located forward in the rotating direction intersects an outer edge of the opening of the discharge port after the inter-tooth chamber facing the partitioning portion comes into communication with the outer extension portion and the inner extension portion, and
wherein when the inner rotor and the outer rotor rotate in the rotating direction, the inter-tooth chamber facing the partitioning portion comes into communication with the outer extension portion before coming into communication with the inner extension portion, and subsequently, the proximate portion separating the inter-tooth chamber from the other inter-tooth chambers intersects the outer edge of the opening of the discharge port.

2. The oil pump according to claim 1, wherein, the inner extension portion is formed of a shallow groove that is shallower than the outer extension portion in the direction of the rotation axis of the inner rotor and the outer rotor.

* * * * *

UNITED STATES PATENT AND TRADEMARK OFFICE
CERTIFICATE OF CORRECTION

PATENT NO. : 10,174,757 B2
APPLICATION NO. : 15/416383
DATED : January 8, 2019
INVENTOR(S) : Masaaki Oowaki It is certified that error appears in the above-identified patent and that said Letters Patent is hereby corrected as shown below:

On the Title Page

Item (54) the Title is incorrect. Item (54) should read:
-- (54) Title: OIL PUMP HAVING EXTENSION PORTIONS THAT REDUCE THE EFFECT OF THE COLLAPSE OF BUBBLES IN THE OIL --

Item (71) the Applicant City is incorrect. Item (71) should read:
-- (71) Applicant: JTEKT CORPORATION, Osaka-shi (JP) --

Signed and Sealed this
Eighteenth Day of February, 2020

Andrei Iancu
*Director of the United States Patent and Trademark Office*